UNITED STATES PATENT OFFICE.

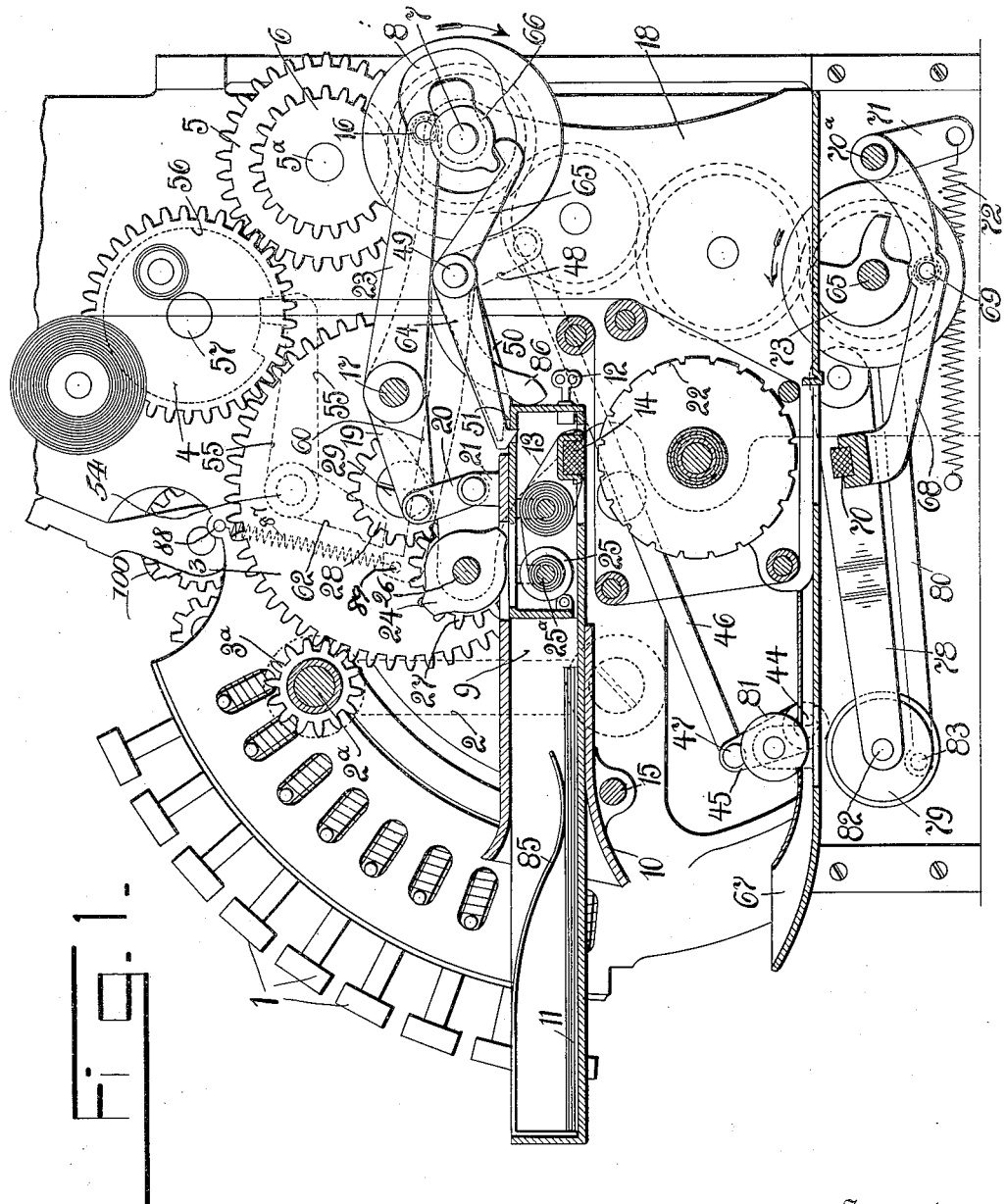

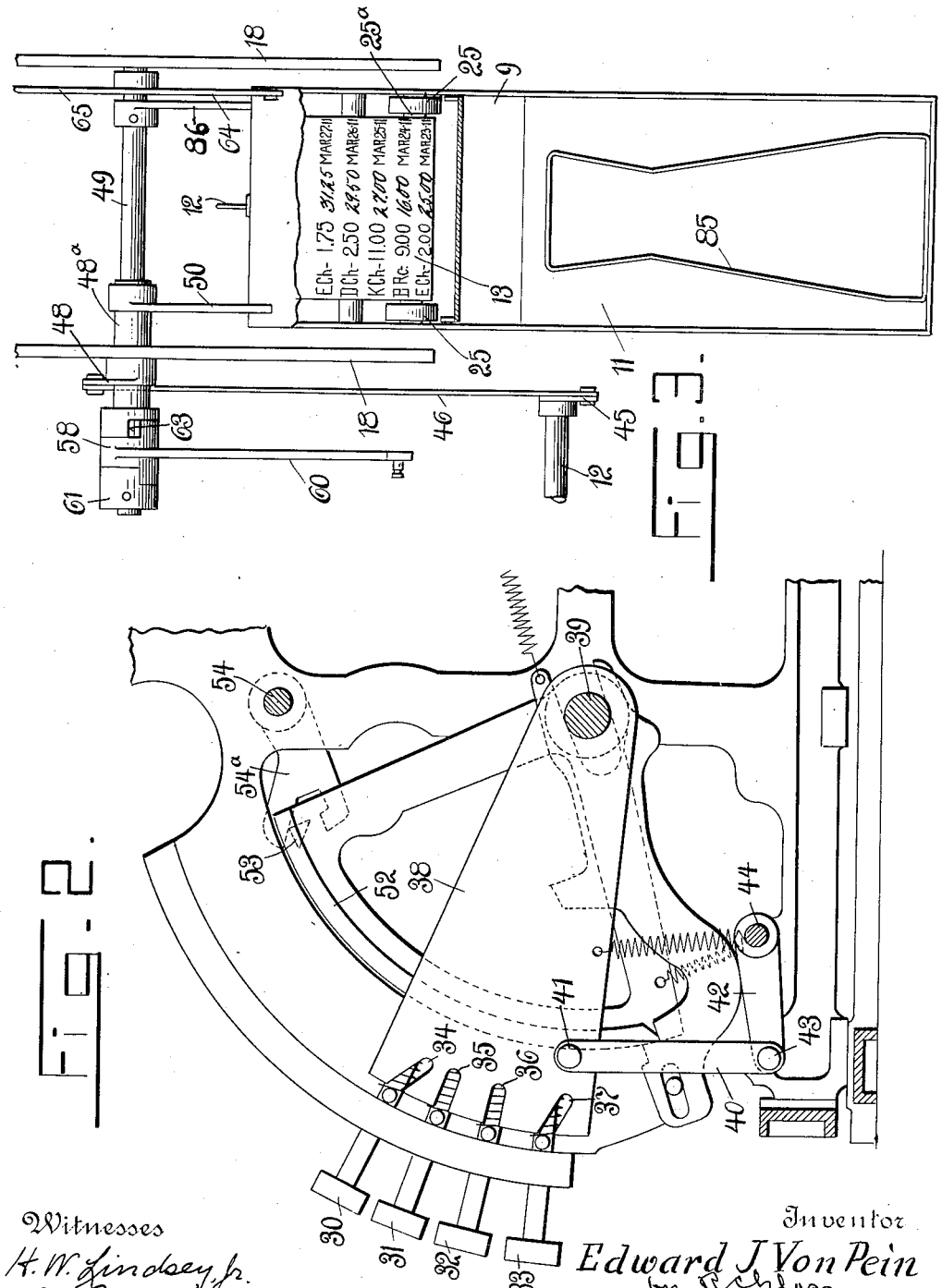

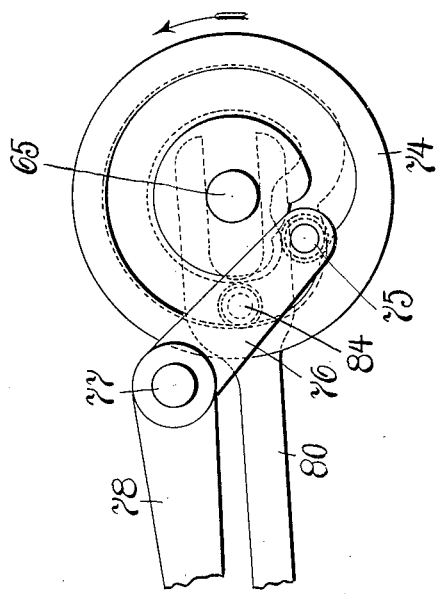

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,198,491.

Specification of Letters Patent. Patented Sept. 19, 1916.

Application filed January 20, 1913. Serial No. 743,114.

*To all whom it may concern:*

Be it known that I, EDWARD J. VON PEIN, a citizen of the United States, residing at Dayton, in the county of Montgomery and State of Ohio, have invented certain new and useful Improvements in Cash-Registers, of which I declare the following to be a full, clear, and exact description.

This invention relates to accounting machines and more particularly to the recording mechanism thereof.

In a grocery or a business of a similar nature, which does a credit business, it is desirable to keep an accurate record of the credit transactions and to keep the accounts of each customer segregated from the accounts of the other customers. It is further desirable to record each transaction on a sales slip and a duplicate, so that one slip may be given to the customer and the other be retained by the proprietor of the establishment, and thus avoid controversies between the parties to the transaction and prevent mistakes or fraud.

The principal object of this invention is to provide a receptacle for recording and segregating the credit transactions of each customer on a detail strip, contained in the receptacle, and it is a further object of this invention to provide means for recording on duplicate sales slips a record of each credit transaction. In accomplishing these objects a receptacle for the account of each customer is provided with a detail strip and platen, the platen being given a movement of invariable extent against a set of type carriers, upon the operation of keys governing the mechanism for the recording of each transaction. The platen is given this invariable movement by the invariable movement given a receptacle carriage by means of the main operating mechanism. The machine is also provided with a guideway for a duplicate sales slip, the slip being placed in the guideway by the proprietor conducting the business or by one of his clerks, with a platen given invariable movement against type carriers, whereby impressions of the transaction are taken on the sales slip, and with a pair of feed rollers given an invariable movement by the proper operating mechanism so that the sales slip may be fed with a short forward movement after an impression is made on the duplicate in order that the original may be in the proper position to receive a like impression.

With these and incidental objects in view, the invention consists in certain novel features of construction, and combinations of parts, the essential elements of which are set forth in appended claims, and a preferred form of embodiment of which is hereinafter described with reference to the drawings which accompany and form part of the specification.

Figure 1 is a transverse vertical section of a machine, well known on the market, with the present invention applied thereto. Fig. 2 is a detail of the special bank of keys, and mechanism coöperating with these keys. Fig. 3 is a detail plan showing the receptacle for the duplicate sales slips and the detail strips. Fig. 4 is a detailed view of the mechanism for operating the feed rollers, which feed the sales slip. Fig. 5 includes two views of the sales slip and the duplicate, a top and a side view.

For the sake of illustration, these improvements have been shown applied to a type of machine well known on the market and exemplified in the patents to Cleal and Reinhard #580,378, issued April 13, 1897, to Frank H. Bickford, No. 690,554, Jan. 7, 1902, and to Thomas Carroll, No. 754,049, issued March 8, 1904. In these patents the principal movements of the machine are clearly shown and described.

Referring to the accompanying drawings, 1 (Fig. 1) represents the amount keys which serve to control the differential motion of the various parts as fully described in the Carroll, and Cleal and Reinhard patents. The machine is driven by means of a handle 2 journaled on a stub shaft $2^a$ fastened to the machine frame. Rigid with the handle 2 is a gear $3^a$ meshing with a gear 3 fast on a shaft 29, and this latter gear engages with a gear 4 rigidly mounted on a shaft 57. On a shaft $5^a$ is fastened a gear 5 which engages with the gear 4. Rigid with the gear 6 which meshes with a gear 5 in a gear on the shaft 7. A box cam 8 is fast on this shaft 7 so that when the crank handle is turned the box cam is rotated by means of this train of gears just described. This box cam 8 controls the impression mechanism, as will be explained. Each receptacle 9 is separated into two apartments, the forward one being used as a file for the duplicate sales slips and the rear one, which is accessible only by means of a key 12, contains a detail strip 13 and a platen 14. This receptacle is for the purpose of recording and segregating the credit accounts of each customer. A carriage 10 for the receptacles is pivoted on the frame of the machine by the rod 15, so that the receptacle may be given an invariable movement by the invariable movement of the following described operating mechanism. A roller 16, projecting from the rear end of an arm 23, engages in the groove of the box cam 8. This arm 23 is loose on a rod 17, which projects from the supporting frames 18. Extending forwardly from the arm 23 is an arm 19, which has secured to its forward end a link 20, the lower end of this link being secured to a lug 21 by a pin. This lug is fast to the top of the rear end of the receptacle carriage 10. When the box cam 8 is rotated, the rear end of the arm 23 is raised, due to the shape of the cam groove, and the rear end of the receptacle is lowered through the link 20 and the arm 19. The purpose of lowering the receptacle with an invariable movement is to bring the platen 14 which is fast on the receptacle against type carriers 22, so that an impression may be made on the detail strip 13 of each credit transaction.

Cams 24 coöperate with disks 25 to feed the detail strip between the taking of impressions. The cams 24 are fast on a shaft 26 which is supported by the frame 18. Fast to the same shaft 26 is a gear 27 which engages with a gear 28 rigid with the large gear 3. The disks 25 are fastened to a roller 25$^a$, upon which the detail strip is wound after it is printed. The construction of this mechanism is such that the cams 24 engage once during each operation of the machine with the disks 25, thereby rotating the disks and roller 25$^a$ so that the detail strips 13 are fed a space before the taking of an impression.

When the receptacle is inserted in the machine it is desirable to provide means for holding it in position while an impression is being taken. This is done by means of the sharp downward projecton on the forward end of an arm 64 engaging in a recess in the top of the receptacle as shown in Figs. 1 and 3. The arm 64 is loosely mounted on the shaft 49 and extending rearwardly from this arm is another arm 65, which at its rear end has a projection engaging with a cam 66. This cam is fast on the shaft 7 and is so constructed that, after an impression on the detail strip is made, the cam projection engages with the projection on the arm 65 and lowers the arm thereby disengaging the projection on the arm 64 from the receptacle so that the same may be partially ejected by mechanism to be presently described.

As the purpose of the present invention is to provide devices for the recording and segregating of credit transactions, it is not desirable that a cash transaction be registered when a receptacle is in the machine. To prevent this a special bank of keys is provided, as shown in Fig. 2, the key 30 controlling the registration of cash transactions, the keys 31 and 32 controlling the operation of the machine for the recording of credit and received on account transactions. Key 33 is for paid out transactions. Adjacent the special bank key is a segment 38 loose on the shaft 39. The pins on the special keys 30, 31, 32 and 33 engage in elongated recesses, 34, 35, 36, and 37, respectively in the segment 38. The recesses 34 and 37 are so inclined that, when the cash or paid out key is pressed, the pin on the key pressed comes into operative relation with the upper face of the recess and raises the forward end of the segment. When the segment is raised a shaft 44 is rocked through a link 40 which is secured to the segment by a pin 41 and to an arm 42 by a pin 43, the arm 42 being rigidly secured to the shaft 44. To this shaft is fast a crank arm 45, which is connected at the other end to a link 46 by a pin 47. The rear end of this link is secured to a crank arm 48 which is fast on a sleeve 48$^a$ surrounding a shaft 49, as shown in Fig. 3. Fast on the same sleeve is an arm 50 and it is therefore obvious that when the cash or paid out key is pressed the rocking of the shaft 44, as explained, will raise the lower end of the arm 48 and hence lower the forward end of the arm 50. The forward end of the arm 50 has a projection forming a shoulder 51, so that when the cash or paid out key is pressed the arm 50 is lowered sufficiently for the shoulder to engage with the rear end of the receptacle 9, should the receptacle be inserted into the machine after the key has been pressed. When the cash or paid out key is not pressed the shoulder 51 of the arm 50 is not in the path of an approaching receptacle and the receptacle can be inserted. Further, when the receptacle is in the machine the cash or paid out key cannot be operated as the arm 50 cannot be lowered, it being in contact with the top of the receptacle 9. As the cash or paid out keys cannot be operated, when a receptacle is in the machine, an impression of a cash or paid out transaction cannot be taken on the detail strip 13 in the inserted receptacle.

As the machine is capable of being operated for either a cash or credit transaction it is desirable that one of the special keys be pressed before the machine can be operated so that the nature of the transaction will be indicated. To provide for this the following mechanism is used. In Fig. 2, 52 is the usual detent plate which is operated as fully described in the Cleal and Reinhard and Carroll patents. On this detent plate is a pin 53 which, when the detent plate is raised as explained in the patents cited above, engages with the lower face of the upper projection on the forward end of an arm 54ª, this arm being rigidly secured to a shaft 54 so that when the detent plate 52 is raised this shaft is rocked. Extending rearwardly from the shaft 54 and fast to it is an arm 55. This arm has an upward extending projection, which, before one of the special keys is pressed, is in engagement with the radial face of the recess in a disk 56 which disk is rigidly mounted on the shaft 57 with the gear 4. When the detent plate is raised the shaft 54 is rocked, the rear end of the arm 55 is lowered, and the projection is taken out of engagement with the disk so that the crank handle 2 can be operated.

This invention being for the purpose of recording credit transactions on a detail strip, a mechanism is provided which prevents the operation of the machine to register a credit or received on account transaction except when a receptacle is in the machine. An arm 86 is fast on the shaft 49 and loosely surrounding the same shaft is a sleeve 58 to which is fastened an arm 60. When a receptacle 9 is inserted, it engages with the curved arm 86 and lowers it, thereby rocking the shaft 49, and lowering the arm 60 by a shoulder on a collar 61 secured to the shaft engaging with a shoulder on the sleeve 58, as shown in Fig. 3. This lowering of the arm 60 by the engagement of the receptacle with the arm 86 takes the projection on the forward end of the arm 60 out of engagement with an arm 62, which is fast on the shaft 54 and permits the rocking of the shaft when the detent plate is raised, as has been explained.

The spring 87, which is under tension between pin 88 projecting from the frame work of the machine and the pin 89 on the arm 60, normally holds the arm 60 in engagement with the arm 62. It can readily be seen that this same mechanism just described, is employed to partially eject an inserted record retaining receptacle from the machine after a printing impression is taken on its detail strip 13 from the type carriers 22. The cam 66 is so designed that the projection on the arm 64 will be carried out of engagement with the inserted retaining receptacle just after the arm 62 is carried back to its normal position (shown in Fig. 1) so that the spring 87 raises the arm 60 to normal position, and in this manner the arm 86 is rocked upward forcing the inserted receptacle forward so that when the arm 64 is lowered to its normal position its projection will not engage in the coöperating recess in the top of the inserted receptacle.

When it is desired to register cash or paid out transactions, it is necessary that the arm 60 be taken out of engagement with the arm 62 so that the crank handle may be operated. This is accomplished by the following mechanism. On the same sleeve 48ª on the shaft 49, to which the arm 48 is made fast, is a shoulder 63, which can engage with a shoulder on the sleeve 58. When the cash or paid out key is operated the arm 48 is raised, and the shoulder on the sleeve 48ª engages with the shoulder on the sleeve 58 and thereby lowers the arm 60, taking the projection on the forward end of the arm 60 out of engagement with the arms 62, and hence allowing the disengagement of the arm 55 from the disk 56. The crank handle can then be operated.

In addition to the mechanism just described whereby the insertible record strip holder controls the operation of the special keys, it is to be understood that the illustrative machine is so constructed that when charge and paid out transactions are entered, the totalizer 100 is not operated to add the amounts. The mechanism whereby this is accomplished is not shown in the accompanying drawings but is fully shown and described in the Bickford patent hereinbefore mentioned.

It will be seen that in the machine as so far described, an impression of each credit transaction is taken on a detail strip in a receptacle by means of a platen mounted in each receptacle and given an invariable movement against type carriers by the invariable movement of the operating device, as has been described, the detail strip being fed between impressions by the invariable movements of a feeding device.

Mechanism is provided in this invention for recording on a duplicate and an original sales slip the character and amount of each credit transaction, one slip being kept by the proprietor and the other given to the customer as a receipt or record of the transaction. This mechanism is constructed and operated in the following manner.

A guideway 67 is for the purpose of holding the sales slips while receiving impressions recording credit transactions. The platen mechanism consists of a frame 68 mounted on a cross shaft 70ª, and the frame carries a pin 69 engaging a cam 73 and at its forward end platen 70. At the rear end of this frame is rigidly secured an arm 71 which at its lower end has attached a spring 72, which is under tension and thereby tends to force the platen against the type carriers. Fast on a shaft 65 is a cam 73, this cam being so constructed that twice during every rotation of the shaft 65 by the intervening gears, it lowers the platen frame 68 tensioning spring 72 and the platen rises twice against the type carriers making an impression on the original and duplicate slips. The feeding mechanism for this sales slip is shown in Figs. 1 and 4. A box cam 74 is fast on the shaft 65 so that, when the crank handle is turned, the cam is rotated by the intervening gears shown in Fig. 1.

Into one of the grooves on the cam 74, shown by the full lines, projects a roller 75, this roller being on the rear end of an arm 76. This arm is loose on the shaft 77 and extending forwardly from it is an arm 78. The forward end of this latter arm supports a feed roller 79 mounted on a pin 82. The groove in the cam 74 is so constructed that, after the first impression is made on the sales slip, it will bring the feed rollers 79 and 81 into contact by lowering the arm 76 and thereby raising the roller 79. The rear end of a pitman 80 is forked and straddles the shaft 65. The forward end of this pitman is secured near the periphery of the feed roller 79 by a pin 83. On this pitman is a roller 84 engaging in the groove of the cam 74 shown by dotted lines (Fig. 4). This latter cam groove is so constructed that as the lower feed roller comes into operative relation with the upper feed roller the lower feed roller is given a slight movement in the counter-clockwise direction thereby feeding the sales slip so that an impression may be taken on the duplicate slip which is longer than the original.

The clerk places the sales slip into the guideway 67, depresses the credit or received on account keys and then the amount keys, and turns the crank handle thereby rotating the cams on the shaft 65. During one rotation the cam 73 twice operates the frame 68, the first time impressing the amount and character of the transaction on the original slip, the second time making a like impression on the duplicate. Between the time for taking these two impressions the roller 79 is raised into contact with the upper roller and the pitman 80 given a short rearward movement by the cam groove, thereby moving the sales slip from its original position into a position in which the duplicate will receive an impression.

The operation of the machine is as follows: The sales slip is made out in the usual way and placed in the guideway 67, and the receptacle assigned to the customer to whom credit is being extended is inserted in its carriage. The key corresponding to the character of the sale is then pressed and the amount keys are operated. Upon turning the crank handle the mechanisms of the present invention are set into motion. The platen being carried in the receptacle is lowered against the type carriers because of the shape of the cam groove 8, through the arms 23 and 19 and the link 20. The detail strip is fed in the same operation of the machine by the cams 24 engaging with the disks 25 fast to the shaft 25ª upon which the detail strip is fed. During the latter part of the operation the arm 64 is disengaged from the receptacle by the raising of the arm through the lowering of the arm 65 by the cam 66, so that the receptacle may be withdrawn after the recording of the transaction. While an impression is being made on the detail strip, as just explained, the cam 73, because of its construction operates twice the platen frame, and the spring 72 brings the platen 70 against the type carriers, the first time making an impression on the original sales slip and the second time making an impression on the duplicate. After the first impression is made the feed roller 79 is raised and given a slight movement in a counter-clockwise direction because of the construction of the grooves in the feed cam 74, as described. This movement of the lower feed roller brings it into operative relation with the upper feed roller and thereby feeds the sales slips so that the duplicate will be in a position to receive an impression. By these mechanisms the object of the invention is accomplished as a permanent record is taken on the detail strip in an inserted receptacle, while a receipt or record of the transaction is given to the customer in the form of a sales slip, the other sales slip being placed in the receptacle under the spring holder 85.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a machine of the class described, the combination with a receptacle for recording and segregating the credit transactions of each customer, of a carrying device for said receptacle, a set of type carriers, and a platen carried in said receptacle and given an invariable movement by the invariable movement of the said receptacle carrying device against said type carriers whereby to take an impression from said type carriers on a detail strip contained in said receptacle.

2. In a machine of the class described, the combination with a receptacle for recording and segregating the accounts of the separate customers, of a type carrier, a platen mounted on said receptacle, given an invariable movement by the invariable movement of the receptacle against said type carriers whereby to take an impression on a detail strip contained in said receptacle, and a feed cam and feed roller having invariable movements and constructed to feed the detail strip a short distance upon each operation of the machine.

3. In a machine of the class described, the combination with a receptacle for recording the credit transactions of each customer, of a receptacle carriage, a type carrier, a platen mounted on said receptacle and moved by the receptacle carriage against said type carrier whereby to take an impression on a detail strip contained in said receptacle, a feeding device for said detail strip, registering mechanism and a device to prevent registering a cash transaction when the receptacle is in the machine.

4. In a machine of the class described, the combination with a receptacle for recording and segregating the accounts of the several customers, of type carriers, a platen given invariable movement against said type carriers whereby to take an impression on a detail strip contained in said receptacle, a feed device for said detail strip, registering mechanism, a device to prevent registering a cash transaction when the receptacle is in the machine, cash and credit keys and a mechanism preventing the operation of the machine until one of the cash or credit keys is operated.

5. In a machine of the class described, the combination with a receptacle for recording and segregating the credit transactions of each customer, of a carriage for said receptacle, a device for locking the receptacle in position during the operation of the machine, type carriers, a platen carried in the receptacle and moved against said type carriers whereby an impression on a detail strip of each transaction is taken, and a feeding mechanism for said detail strip.

6. In a machine of the class described, the combination with a plurality of detachable record retaining holders, each carrying a record strip and insertible into the machine; of a set of type carriers for entering amounts on the record strip of any holder inserted into the machine; and means for partially ejecting the holder from the machine after a printing impression has been taken of its detail strip.

7. In a machine of the class described, the combination with a plurality of detachable holders, each carrying a record strip and insertible into the machine; of a platen carried by each holder; a set of type carriers in the machine; means for effecting contact between the platen of any holder inserted into the machine and the type carriers to take an impression on the record strip in the inserted holder; and means for partially ejecting the inserted holder from the machine.

8. In a machine of the class described, the combination with a plurality of detachable receptacles, each carrying a record strip and insertible into the machine; of means in the machine for entering a record on the record strip of any receptacle inserted into the machine; and means in the machine for moving said receptacle, so that said record means may enter a record on the record strip.

9. In a machine of the class described, the combination with a plurality of detachable receptacles, each carrying a record strip and insertible into the machine; of a platen carried by each receptacle; a set of type carriers in the machine; and means for rocking the receptacle in the machine during an operation of the machine so that the platen of the inserted receptacle is carried against said type carriers whereby an impression is taken on the record strip.

10. In a machine of the class described, the combination with a plurality of detachable receptacles each carrying a record strip and insertible into the machine; of a set of type carriers for entering amounts on the record strip of any receptacle inserted into the machine; means for feeding the record strip while the receptacle is in the machine; and means for partially ejecting the inserted receptacle from the machine.

11. In a machine of the class described, the combination with a plurality of detachable receptacles, each carrying a record strip and separately insertible into the machine; of a device for locking any inserted receptacle in the machine during the operation thereof; means in the machine for entering a record on the record strip of the inserted receptacle; and means for disabling said locking device.

12. In a machine of the class described, the combination with a plurality of detachable receptacles, each carrying a record strip and separately insertible into the machine; of an arm in the machine having a projection for engaging the inserted receptacle to retain it in the machine during an operation thereof; means in the machine for entering a record on the inserted receptacle; and cam means for operating said arm whereby the inserted receptacle is released after a record has been entered thereon.

13. In a machine of the class described, the combination with a detachable record retaining device, containing a record strip and a platen, the record strip over the platen being adapted to receive a written record when the device is not in the machine; of printing mechanism in the machine adapted to be engaged by said platen to enter printed records on the record strip when the device is in the machine, special keys, and means preventing insertion of said record retaining device when certain of said special keys are depressed.

14. In a machine of the class described, the combination with a detachable record retaining device containing a record strip and a platen, the record strip over the platen being adapted to receive a written record when the device is not in the machine; of printing mechanism in the machine; means for engaging said platen with the printing mechanism to enter printed records on the record strip when the device is in the machine; and means for feeding the record strip after receiving a printed record, so that a fresh surface will be in position to receive a written record, special keys, and means preventing the operation of certain of said keys when a record retaining device is inserted in the machine.

15. In a machine of the class described, the combination with a detachable record retaining device, containing a record strip and a platen, the record strip over the platen being adapted to receive a written record when the device is not in the machine; of printing mechanism in the machine; means for engaging said platen and said printing mechanism to enter printed records on the record strip when the device is in the machine; and means for partially ejecting the device from the machine after its record strip has received a printed record.

16. In a machine of the class described, the combination with a detachable record retaining device containing a record strip and a platen, the record strip over the platen being adapted to receive a written record when the device is not in the machine; of printing mechanism in the machine; means for engaging said platen and said printing mechanism to enter printed records on the record strip when the device is in the machine; means for feeding the record strip after receiving a printed record, so that a fresh surface will be in position to receive a written record; and means for partially ejecting the device from the machine after its record strip has received a printed record.

17. In a machine of the class described, the combination with a printing mechanism for printing on record slips, of a plurality of normally detached devices each comprising a casing having two compartments, one compartment being used for the printed record slips, and the other compartment for a record strip which is adapted to receive impressions from the printing mechanism when its device is in the machine, the impressions on the record strip and record slips being similar so that the record slips may be filed in the devices whose record strips have received like impressions.

18. In a machine of the class described, the combination with printing mechanism for printing on record slips; of a plurality of normally detached devices and comprising a casing having two compartments, one compartment being used for the printed record slips, and the other containing a record strip which is adapted to receive impressions from the printing mechanism similar to those received by the record slips when the device is in the machine; and means for locking the compartments holding the record strips against access.

19. In a machine of the class described, the combination with a plurality of normally detached receptacles separately insertible into the machine, and each comprising a locked compartment carrying a record strip; of means in the machine for entering a record on the record strip of any receptacle inserted into the machine; and means for unlocking said locked compartments of the detached receptacles.

20. In a machine of the class described, the combination with type carriers for entering records on record material; of two normally disengaged feeding rolls for said record material; an oscillatory arm carrying one of said rollers; a reciprocatory member loosely pivoted to the side of the roll carried by said arm; and means for first raising said arm to bring said rolls into engagement and then giving said member a movement in one direction to rotate the rollers in a feeding direction, and finally restoring the member to normal position after said rollers have been disengaged.

21. In a machine of the class described, the combination with a normally detached record retaining device adapted to receive records when the device is not in the machine, of means in the machine for entering other records in the retaining device when the device is in the machine, and means for partially automatically ejecting the record retaining device at the end of each operation of the machine.

22. In a machine of the class described, the combination with a normally detached record retaining device comprising a record strip adapted to receive records when the device is not in the machine, of means in the machine for entering records on the strip when the retaining device is in the machine, and means for partially ejecting the device from the machine after the record is made therein.

23. In a machine of the class described, the combination with manipulative entry classifying devices, of an operating mechanism, a normally effective lock for said mechanism, connections whereby manipulation of the manipulative devices will render said lock ineffective, a device insertible into the machine to have records made therein, and means controlled by the insertible device and in turn controlling manipulation of the manipulative devices.

24. In a machine of the class described, the combination with a plurality of entry classifying keys, of an operating mechanism, a normally effective lock for said mechanism, connections whereby operation of any classifying key will disable the lock, a device insertible into the machine to receive and retain records, and means controlled by the insertible device, said means in turn controlling operation of the keys.

25. In a machine of the class described, the combination with accounting mechanism, of a series of item classifying keys, a lock for the accounting mechanism controlled by said keys, a device insertible to receive and retain records of certain classes of entries made by the accounting mechanism, and means whereby insertion of said device will prevent operation of keys representing other classes.

26. In a machine of the class described, the combination with an accounting mechanism, of means normally preventing operation of said mechanism, a plurality of manipulative devices controlling said means, a device insertible to receive and retain records of transactions entered by the accounting mechanism, and means whereby insertion of said device will prevent operation of certain ones of the manipulative devices.

27. In a machine of the class described, the combination with an accounting mechanism, of means normally preventing operation of said mechanism, a series of keys controlling said means, a normally ineffective lock for certain ones of said keys, a device insertible to receive records of transactions entered by the accounting mechanism, and means controlled by the insertible device for rendering the aforesaid lock effective.

28. In a machine of the class described, the combination with type carriers, of mechanism for operating the type carriers, means normally preventing operation of said mechanism, a plurality of keys controlling the preventing means, a record strip device insertible to receive entries from the type carriers, and means whereby insertion of the record strip device will lock certain ones of the keys against operation.

29. In a machine of the class described, the combination with an accounting mechanism, of means normally preventing operation of said mechanism, a series of keys controlling said means, a device insertible to receive and retain records of transactions entered by the accounting mechanism, and means whereby insertion of said device will prevent operation of certain ones of the series of keys.

30. In a machine of the class described, the combination with accounting mechanism, of manipulative devices for classifying entries, a device insertible into the machine to receive and retain records, and means controlled by the insertible device, said means in turn controlling the manipulation of the manipulative devices.

31. In a machine of the class described, the combination with accounting mechanism comprising a plurality of entry classifying keys, of a device insertible into the machine to receive and retain records, and means controlled by the insertible device and in turn controlling operation of the keys.

32. In a machine of the class described, the combination with a plurality of entry classifying keys, of means normally preventing operation of keys for certain classes, a record retaining device insertible into the machine to receive and retain records of the classes of items represented by the normally inoperable keys, and devices whereby insertion of the entry retaining device will disable the aforesaid means and render the keys for the other classes inoperable.

33. In a machine of the class described, the combination with an accounting mechanism, of a plurality of manipulative devices for classifying entries, a device insertible to receive and retain records of certain classes of entries, and means whereby insertion of the insertible device will prevent operation of the manipulative devices to represent other classes of entries.

34. In a machine of the class described, the combination with an accounting mechanism, of a plurality of selectively depressible entry classifying keys, a device insertible to receive and retain records of certain classes of entries, and means whereby insertion of the insertible devices will prevent operation of the entry classifying keys of certain other classes.

35. In a machine of the class described, the combination with a set of type carriers constructed to print characters designating various classes of transactions and the amounts thereof, differential mechanism for setting the type carriers, a keyboard for controlling the differential mechanism and comprising entry classifying keys, an insertible record strip device, means for operating the inserted device to take impressions on the strip from the type carriers, and means whereby insertion of the insertible devices will prevent operation of certain of the entry classifying keys.

36. In a machine of the class described, the combination with a normally detached record retaining device adapted to receive records when the device is not in the machine, of means in the machine for entering other records in the retaining device when the device is in the machine, special keys, and means whereby a record retaining device cannot be inserted into the machine when certain special keys are depressed.

37. In a machine of the class described, the combination with a normally detached record retaining device adapted to receive records when the device is not in the machine, of means in the machine for entering other records in the retaining device when the device is in the machine, special keys, and means for preventing depression of certain special keys when a record retaining device is inserted in the machine.

In testimony whereof I affix my signature in the presence of two witnesses.

EDWARD J. VON PEIN.

Witnesses:
R. C. GLASS,
CARL BEUST.